United States Patent [19]

Feldman

[11] 3,762,668

[45] Oct. 2, 1973

[54] SINGLE PASSENGER FLEXIBLE ROTOR AIRCRAFT

[76] Inventor: Lewis Feldman, 88 Nanau Rd., Massapequa, N.Y. 11758

[22] Filed: Aug. 23, 1971

[21] Appl. No.: 174,035

[52] U.S. Cl. .............................. 244/17.11, 416/88
[51] Int. Cl. ............................................. B64c 27/48
[58] Field of Search ................... 244/17.11, 17.19, 244/17.21, 17.23, 17.25, 17.27, 4; 416/87, 88, 89

[56] References Cited
UNITED STATES PATENTS

| | | | |
|---|---|---|---|
| 2,640,549 | 6/1953 | Isacco | 416/88 X |
| 3,010,678 | 11/1961 | Gose | 244/17.11 |
| 3,065,799 | 11/1962 | McCarty, Jr. | 416/88 X |
| 3,184,187 | 5/1965 | Isaac | 244/17.11 X |

Primary Examiner—Milton Buchler
Assistant Examiner—Paul E Sauberer
Attorney—Larson, Taylor & Hinds

[57] ABSTRACT

A personal aircraft vehicle includes a compartment having a platform on which the single operator stands and a drive system which includes jet engines located at the tips of flexible, extensible rotor blades secured to a rotatable drum. The blades extend through slots in an outer shroud which is selectively clutched to the drum to control deployment of the blades. The drum serves as a fuel tank and fuel is supplied to the engines through tubing in the blades. The craft is controlled during flight by the drive engines and the operator through the shifting of his weight within the compartment.

12 Claims, 7 Drawing Figures

INVENTOR
LEWIS FELDMAN

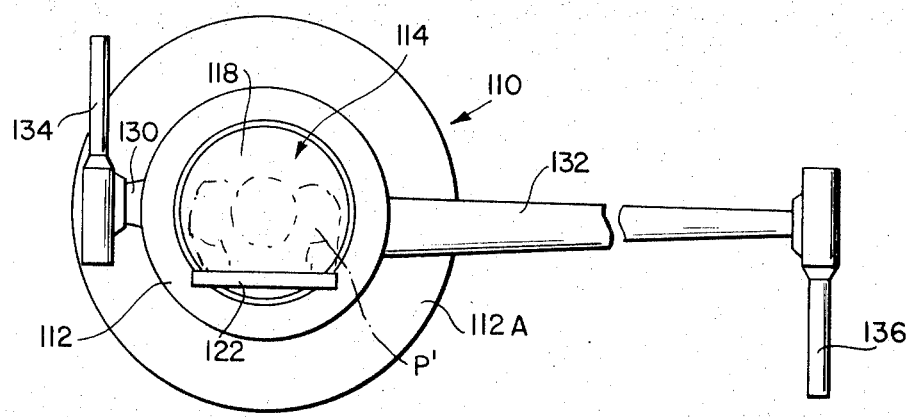
FIG. 5
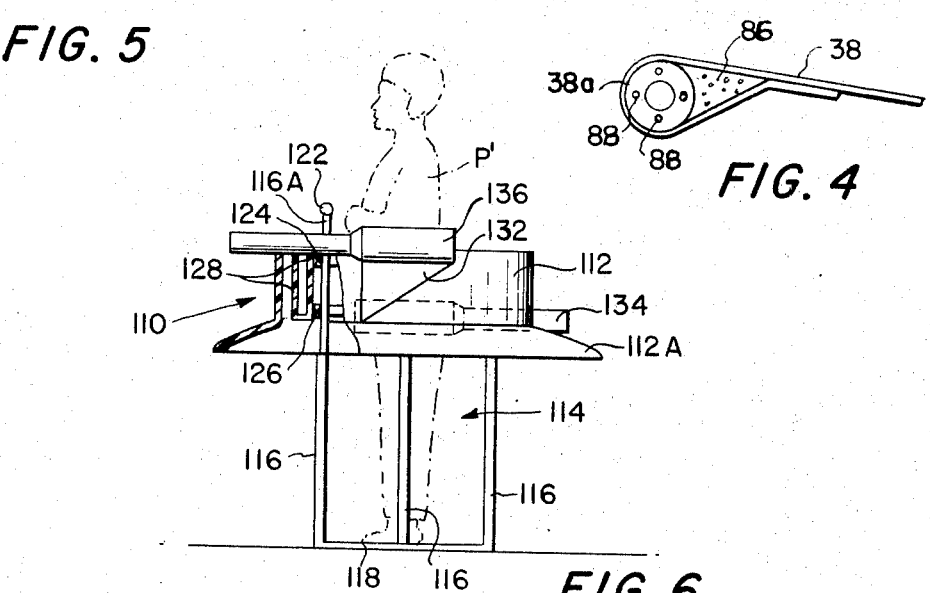
FIG. 4
FIG. 6
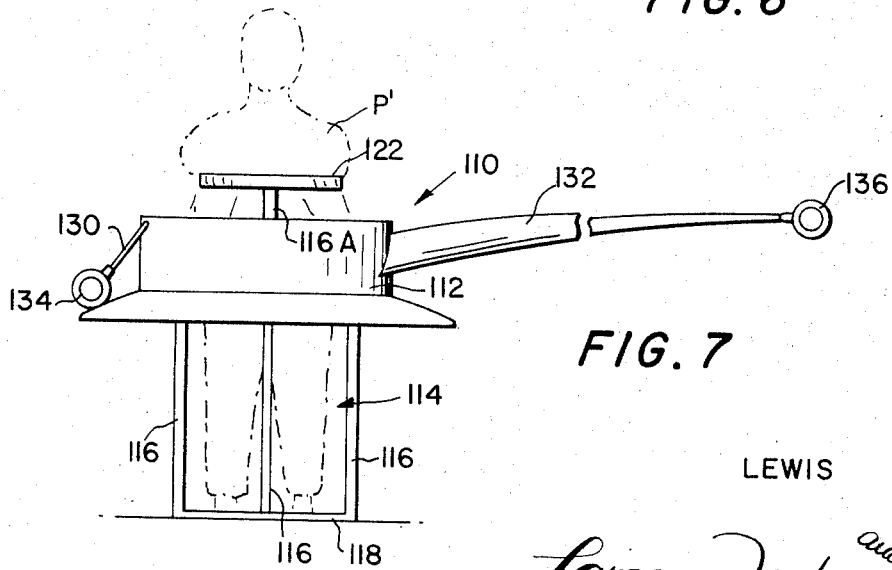
FIG. 7
INVENTOR
LEWIS FELDMAN
BY Larson, Taylor and Hinds
ATTORNEYS

SINGLE PASSENGER FLEXIBLE ROTOR AIRCRAFT

CROSS REFERENCES TO RELATED APPLICATIONS

Reference is made in this application to copending application Ser. No. 789,328, entitled "Improvements in Flexible Sail Rotor Devices" and filed on Jan. 6, 1969, now U.S. Pat. No. 3,633,850 and to copending application Ser. No. 174,036, entitled "Sail Rotor Crane" and filed concurrently herewith.

FIELD OF THE INVENTION

The present invention relates to lightweight, single passenger, helicopter-type aircraft vehicles.

BACKGROUND OF THE INVENTION

A need has existed for some time for a relatively inexpensive, lightweight personal aircraft vehicle for use by individuals in relatively short range travel, and a number of proposals have been made in this area. A suitable vehicle of this type might be adapted for use both for military purposes, such as in air reconnaissance, and for civilian purposes, such as in commuting. It will be appreciated that a number of factors such as the cost of the vehicle, the operational stability and dependability thereof, the weight and maneuverability of the vehicle, and the flight range thereof, place limitations on the design and construction of such a vehicle and that these factors must be balanced in an optimum performance vehicle. In general, no previously proposed vehicle of type described provides the necessary mobility, stablity, and general operational effectiveness while at the same time is relatively inexpensive, light in weight and easy to control.

SUMMARY OF THE INVENTION

In accordance with the present invention, a personal aircraft vehicle is provided which possesses the desired attributes discussed above. Among other advantages, an aircraft vehicle in accordance with the present invention is relatively light in weight; substantially reduces the complexity of the controls required; provides medium range flights capabilities, a flight radius of 35 miles being estimated for a 100-lb. vehicle; is both mobile and stable; and is relatively inexpensive to construct and maintain.

According to a presently preferred embodiment of the invention, a reaction-driven, flexible rotor, personal aircraft vehicle is provided which includes a compartment comprising a platform on which the operator or pilot stands and an open support framework extending upwardly from the platform for supporting the drive system. The drive system itself includes at least two flexible rotor blades which are preferably constructed of sail fabric or the like and which are secured to a centrally located rotary storage drum, the blades being wrapped around the drum for stowage. Propulsion is provided by reaction motors such as pulse-jet engines mounted at the tip of the blades, the sail rotor blades requiring some weight at the tip for stabilization and the tip jets thus serving as tip weights as well as in providing thrust.

The fuel or propellant for the tip jets is contained in an annular tank which also serves as the central storage drum mentioned above. Fuel lines or hoses connecting the tank and the tip jets are located in the leading edge of the sail rotor blades and consequently serve in providing the proper aerodynamic shaping of the blades. The fuel lines are preferably reinforced with substantial amounts of steel wire or the like so that the lines have the required tensile strength necessary to withstand the fuel pressure generated by the centrifugal forces exerted during operation of the vehicle, these forces ranging up to on the order of 1,700 p.s.i. The fuel lines, because of this reinforcement, also serve as the principal tensile reinforcement element in the sail rotors themselves. The central opening in the fuel tank permits the tank to be bearing mounted on a central spindle and to rotate with the blades and hence the fuel lines can be directly connected to the tank without using a rotating joint.

In the stowed positions of the blades, the main portions of the blades are wound onto the outer surface of the fuel tank for storage. The blades pass through respective slots in an outer shroud or drum and the tip engines are located outwardly of this outer drum. In the stowed position, the tip engines are clipped to a disk-shaped shield or skirt which is secured to the bottom of the shroud and rotates therewith. A clutch mechanism, controlled by the operator during the deployment of the blades, controls rotation of the outer drum with respect to the fuel tank.

Other features and advantages of the present invention will be set forth in or are apparent from the detailed description of presently preferred embodiments found hereinbelow.

BRIEF DESCRIPTION OF THE DRAWINGS

FIG. 4 is a sectional view taken along line IV—IV of FIG. 1, drawn to an enlarged scale;

FIG. 5 is a top elevational view of a second embodiment of the invention;

FIG. 6 is a side elevational view of the embodiment of FIG. 5; and

FIG. 7 is a front elevational view of the embodiment of FIG. 5.

DESCRIPTION OF THE PREFERRED EMBODIMENTS

Figure 1:
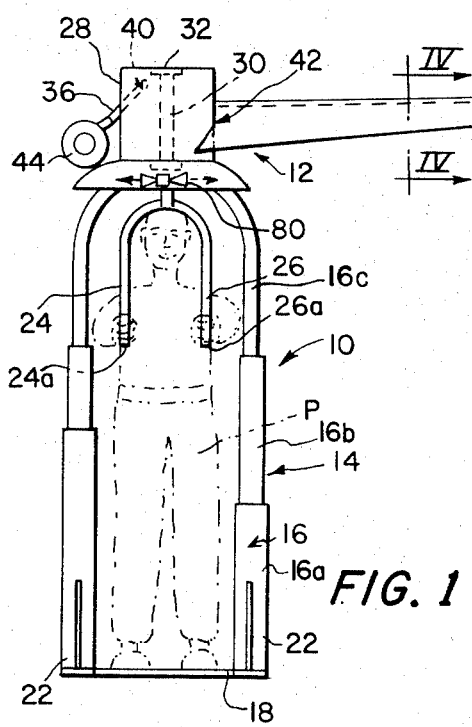
FIG. 1 is a front elevational view of a first embodiment of the flexible rotor vehicle of the invention showing one blade in the operative position thereof and another blade in the stowed position thereof.
Figure 2:
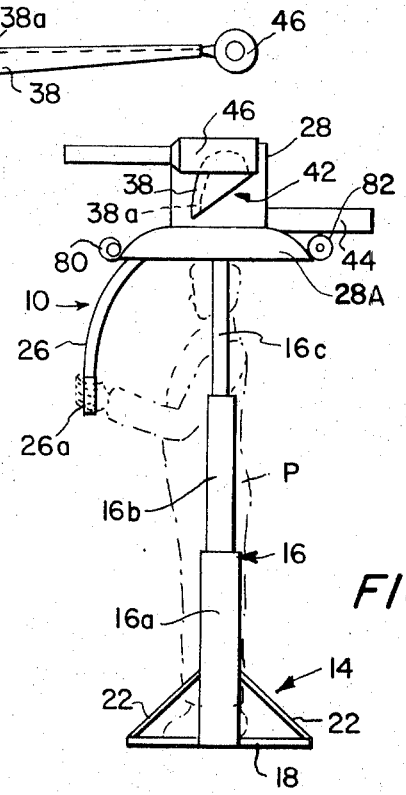
FIG. 2 is a side elevation view of the embodiment of FIG. 1.

Referring particularly to FIGS. 1 and 2, a first embodiment of an aircraft vehicle in accordance with the invention is shown. The vehicle, which is generally denoted 10, includes a drive system 12 mounted atop a support arrangement 14 for supporting the operator during flight. The support arrangement includes a generally U-shaped, rod-like frame member 16 which extends perpendicularly upwardly from and is secured to a base member or platform 18 on which the operator or pilot, denoted P, stands. First and second pairs of support struts 20 and 22, extending between base member 18 and frame 16, serve in maintaining frame 16 upright. The arms of frame member 16 are preferably made up of telescoping sections 16a, 16b and 16c so that the vehicle 10 may be collapsed into a compact form for transport. First and second curved arms 24 and 26 extend outwardly and downwardly from the apex of frame 16 to form handles for gripping by the operator. Arms 24 and 26 may include hand grips 24a and 26a at the free ends thereof to ensure a firm grip.

Figure 3:
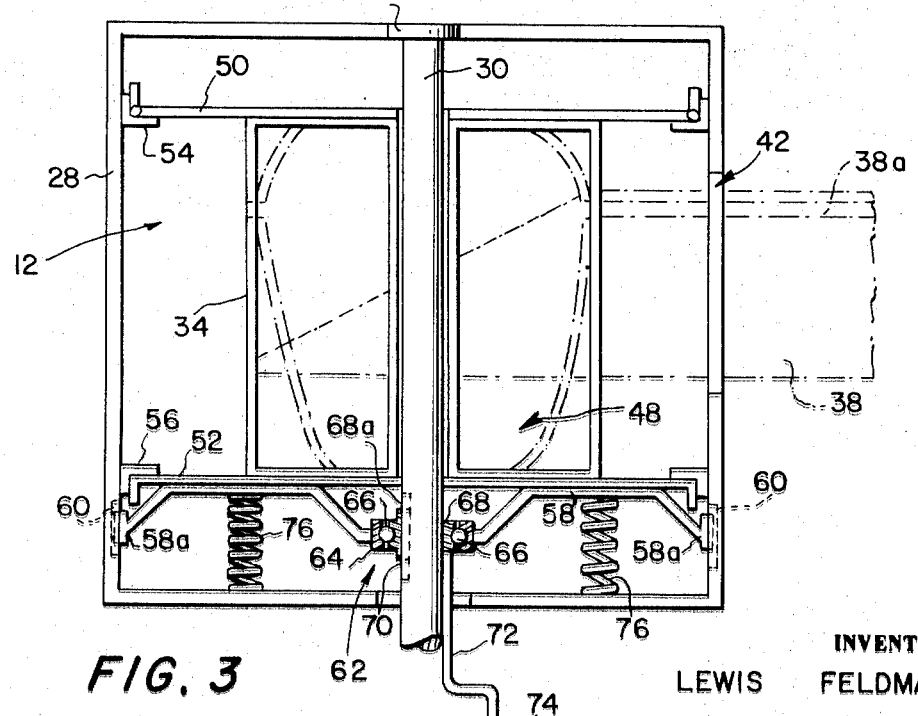
FIG. 3 is a fragmentary sectional view, to an enlarged scale, of a detail of the embodiment of FIGS. 1 and 2 illustrating a suitable clutch mechansim.

The drive system 12, best seen in FIG. 3, includes an outer shroud or drum 28 which is mounted for rotation relative to a central spindle or shaft 30 by an upper gearing 32. A drum 34, mounted inwardly of the concentric with shroud 28 serves as a spool about which and from which first and second sail rotor blades 36 and 38 (see FIGS. 1 and 2) are wound and unwound. Blades 36 and 38 are secured to the outer cylindrical surface of drum as is indicated in dashed lines in FIG. 3 for blade 38 and extend through corresponding slots 40 and 42 in the wall of shroud 28. Slots 40 and 42 are skewed relative to the longitudinal axis of drum 34 as shown in FIGS. 1 and 2.

The power for drive system 12 is furnished by first and second tip engines or rockets 44 and 46 located at the ends of blades 36 and 38, respectively, etc. In the stowed positions thereof engines 44 and 46 are clipped or latched by clips (not shown) to an outwardly extending disc or skirt 28A formed integrally with or otherwise secured to shroud 28. Skirt 28A, in addition to serving as a mount for engines 44 and 46, also provides some protection for pilot P.

Fuel for the engines 44 and 46 is stored within tank 48 which is formed by drum 34. Drum 34 is mounted within shroud 28 by upper and lower annular bearing plates 50 and 52 which are secured to tank 48 and which cooperate with corresponding bearing rings 54 and 56 to permit relative rotation therebetween. Lower bearing plate 52 normally rests on and drives an annular pressure plate 58. Pressure plate 58 is splined to the shroud 28 through means of a series of outwardly extending fingers 58a received in corresponding longitudinal slots or grooves 60 in the inner surface of shroud. Pressure plate 58 is also mounted for rotation relative to central shaft 30 by a bearing assembly 62 including an outer annular race 64 formed integrally with or otherwise secured to plate 58, a plurality of intermediate ball bearings 66, and an inner race 68. Inner race 68 includes at least one inwardly extending splining member 68a received in a longitudinal slot 70 in shaft 30 for splining inner race 68 to shaft 30. A downwardly extending handle 72 secured to inner race 68 terminates in a hand grip 74 positioned in easy reach of the operator or pilot P. A series of springs 76 which bear against the base of shroud 28 press plate 58 against drive plate 52 so that rotation of drum 34 resulting from energization of tip rockets 44 and 46 causes shroud 28 to rotate in unison therewith because of the frictional engagement between two plates 52 and 58. However, if pressure plate 58 is displaced downwardly as permitted by the splining assembly formed by fingers 58a and groove 60 and splining member 68a and slot 70, parallel to the longitudinal of axis of shaft 36 against the biassing forces of springs 76 through pulling of handle 72 by the operator P, the frictional engagement between drive plate 52 and pressure plate 58 is broken. Hence, drive plate 52, pressure plate 58, springs 76, and hendle 74 form a clutch mechanism for controlling coupling between shroud 28 and drum 34.

In a preferred embodiment a friction clutch designed to slip at a given torque rating would be utilized. Such clutches are, of course conventional and well developed. With such a clutch, the shroud 28 will be locked to the drum 34 until the centrifugal force on blades 36 and 38 exert a force great enough to overcome the slip rating of the clutch. When this slip rating is exceeded, the shroud 28 will rotate with respect to the drum allowing the blades 36 and 38 to deploy.

Fuel from tank 48 is preferably supplied to tip engines 44 and 46 through fuel lines 36a and 38a incorporated in blades 36 and 38. As is described in more detail in copending application Ser. No. 174,036 entitled SAIL ROTOR CRANE and filed concurrently herewith, the fuel lines 36a and 38a are preferably disposed along the leading edge of the blades 36 and 38 so as to serve in providing the necessary aerodynamic shaping of the blades 36 and 38, in addition to the more obvious function of supplying fuel to the engines 44 and 46.

FIG. 4 shows a cross section of blade 38 showing the disposition of fuel line 38a therein. As shown, the blade fabric is turned under at the leading edge and sewn or otherwise affixed to an inboard portion to form a space in which fuel line 38a is disposed. The portion of this space not occupied by line 38a is filled with a suitable material, indicated at 6, such as molded rubber or soft plastic, to form a suitably shaped afterbody. Fuel line 38a includes a plurality of steel wires 8 incorporated therein and extending parallel to the longitudinal axis thereof providing reinforcement of line 38a. A substantial amount of steel wire 8 preferably is used so that the fuel line 38a provides substantial tensile strength. By using this approach, the hose member 38a serves as the main tensile strengthening element of the blade 38a as well as the fuel line. Because, as discussed above, the fuel pressure generated by the centrifugal action are on the order of 1,700 p.s.i., a strong hose is required in any event and the required tensile capacity is inherent in the construction shown. Hence the fuel line 38a actually serves two functions in addition to the normal expected function thereof, namely, strengthening of blade 38 and serving in providing the required aerodynamic shaping of the leading edge of blade 38.

The fuel tank 48 may be constructed with the portion thereof in communication with the fuel lines 38a being shown in FIG. 3 bulged outwardly as indicated in dashed lines in FIG. 3. This construction ensures optimum utilization of the fuel in the tank 48 in that the fuel being flung outwardly by centrifugal force during rotation of the tank 48 will seek the outermost limits of the tank 48 and hence will be concentrated in the area of the tank 48 adjacent the fuel outlet.

The attitude of the vehicle 10 can be controlled by means of rockets or thrustors 80 and 82 mounted orthogonally to one another on a protective skirt 28A secured to frame 16. Rockets 80 and 82 are each of conventional construction and include a pair of oppositely acting thrust nozzles which may be alternately energized by the pilot P to control rotation of frame 16. Rockets 80 and 82 are controlled by pilot P through hand controls (not shown), incorporated in arms 24 and 26, which control the amount of fuel transmitted to the rockets. By selectively controlling the amount and direction of the thrust produced by rockets 80 and 82 the desired heading of the vehicle 10 can be maintained.

The control system for the tip engines 44 and 46 has been omitted for purposes of clarity of illustration in that the control system forms no part of the present invention. The control system can take a number of conventional forms and pilot operated control such as control switches and variable control levers may be mounted in control handle 72 and connected to engines 44 and 46 through suitable conductors (not shown) built into the leading edge fairing of the rotor blades 36 and 38. Reference is made to copending application Ser. No. 789,328, filed on Jan. 6, 1969 and now U.S. Pat. No. 3,633,850, for a discussion of a control system suitable for use in a considerably more complex flexible rotor craft. Reference is also made of that application for further details as to the construction of the blades and drive engines.

In operation, the tip engines 44 and 46 are started while in the stowed position shown in the left hand portion of FIG. 1, both engines, of course, being stowed at this time. The thrust produced by engines 44 and 46 causes rotation of the whole upper assembly, including drum 34 and outer shroud 28, until the centrifugal force generated reaches approximately 10g's. At this speed, the clips (not shown) holding the tip engines 44 and 46 to the disc or skirt 38A are released and the engines 44 and 46 rise under the action of the centrifugal force until the blades 36 and 38 are nearly horizontal. The blades 36 and 38 cannot deploy because, at this time, the outer shroud 28 is clutched to the drum 34 through the clutch mechanism described hereinabove which hence prevents release of the blades 36 and 38. To release the blades 36 and 38, the pilot P intermittently operates the clutch release control handle 72 to permit gradual deployment of the blades 36 and 38 while at the same time controls a throttle (not shown) to maintain the desired rotor r.p.m. and thus the desired centrifugal force. In this manner, the blades 36 and 38 are completely deployed to the full extent thereof under the control of operator P. Upon deployment of the blades 36 and 38, the pilot P uses the previously mentioned throttle to control the rpm of the fixed pitch rotors and the clutch release control is no longer required.

With the slip clutch arrangement described hereinabove, as before, the pilot advances the throttle to increase the thrust of rocket motors 44 and 46 causing an increase in rotor rpm and an attendant increase in centrifugal force and hence clutch torque. When the clutch torque exceeds the clutch slip rating, the blades 36 and 38 will deploy to a larger radius. This increase in radius will cause a decrease of the rpm of blades 36 and 38 and a decrease in centrifugal force and torque applied to the clutch. When the applied torque falls below the clutch slip rating, the clutch will again lock the shroud to the drum thereby preventing further blade deployment. The cycle is then repeated until the blades 36 and 38 are fully deployed.

By increasing thrust provided by engines 44 and 46 the rotor rpm can be increased until hovering of vehicle 10 is achieved. Longitudinal and lateral control of movement of vehicle 10 is effected using so-called "kinesthetic control," the pilot P shifting his weight within the vehicle 10 to provide this control.

At the conclusion of the flight the pilot P brings the vehicle 10 to the ground and thereupon immediately reduces the rpm of the blades 36 and 38 to prevent inadvertent bouncing. The tip engines 44 and 46 are then gradually decelerated hence permitting the blades 36 and 38 gradually to droop until the blades 36 and 38 stop and hang vertically. Stowing of the blades is then accomplished manually by releasing the clutch coupling between the outer shroud 28 drum and the drum 34 and then rotating the shroud 28 about the drum 34.

Referring to FIGS. 5 to 7, a second embodiment of an aircraft vehicle in accordance with the invention is shown. The vehicle, generally denoted 110, includes a rotary shroud 112, and associated skirt 112A, mounted for rotation relative to a pilot compartment 114 which defines a space in which the pilot P' of the vehicle 110 stands. Compartment 114 is formed by a series of four upright rod-like members 116 secured to, and equally spaced about the periphery of, a base member or platform 118 to form a cage-like constructions as shown. An extension 116A of forwardmost upright rod-like member 116 extends upwardly above the remaining members 116 and terminates in a cross member 122 to provide a handle for gripping by the pilot P° of the craft. First and second annular bearing rings 124 and 126 (see FIG. 6) are secured to upper portions of rod-like members 116 at vertically spaced locations as shown. Bearing rings 124 and 126 permit rotation of toroidal drum 128 (see FIG. 6) relative to compartment 114 concentric with and inwardly of outer shroud 112. Drum 128 serves as a fuel tank and as a spool for stowing first and second blades 130 and 132. As discussed hereinabove, tip engines 134 and 136 are affixed to the outboard ends of blades 130 and 132 to provide the vehicle drive. A clutch mechanism (not shown) similar to that discussed above provides selective coupling of drum 128 to outer shroud 112. In general, apart from the construction details set forth, vehicle 110 is similar to vehicle 10 in make-up and function and hence further discussion thereof is thought unnecessary.

Although the invention has been described in detail with particular reference to preferred embodiments thereof, it will be understood that variations and modifications can be effected in the invention as described hereinabove and as defined in the appended claims without departing from the scope and spirit of the invention.

I claim:

1. A personal aircraft vehicle comprising a compartment for occupancy by a single operator including a platform on which the operator stands during the operation of the vehicle, and drive means secured to said compartment for providing locomotion of said compartment, said drive means including an annular rotatable fuel tank forming a rotatable hub, at least first and second flexible rotors secured at the inboard ends thereof to said tank, first and second jet engines secured to outboard ends of said rotors, bearing means for rotatably coupling said tank to said compartment, an outer annular drum including first and second apertures through which said first and second rotors extend, bearing means for rotatably coupling said tank and said drum and clutch means for selectively clutching said tank to said drum.

2. A personal vehicle as claimed in claim 1 further comprising a protective skirt secured to and extending downwardly from said outer drum.

3. A personal vehicle as claimed in claim 2 further including means for releasably retaining each of said jet engines in a stowed position upon said skirt.

4. A personal vehicle as claimed in claim 3 wherein said jet engines comprise pulse jet engines.

5. A personal vehicle as claimed in claim 4 wherein said clutch means comprises a drive plate secured to said annular fuel tank, a pressure plate, means for biasing said pressure plate into contact with said drive plate, a central spindle mounted for rotation relative to said outer drum, spline means for slidingly coupling said pressure plate to said outer drum and said central spindle so as to permit axial movement of said pressure plate relative to said outer drum and said central spindle, against the biasing force of said biasing means, to disengage said pressure plate from said drive plate and operator-controlled means for controlling said axial movement of said pressure plate.

6. A personal vehicle as claimed in claim 1 further comprising first and second fuel lines located in said flexible rotors for connecting said first and second jet engines to said fuel tank.

7. A personal vehicle as claimed in claim 6 further comprising strengthening means for reinforcing said fuel lines comprising metallic filaments extending longitudinally of said lines.

8. A personal vehicle as claimed in claim 7 wherein said fuel lines are located in the leading edge of said rotors and serve in forming the aerodynamic profile of said rotors.

9. A personal vehicle as claimed in claim 7 wherein the cross-sectional profile of the outer wall of said fuel tank is bulged outwardly so that fuel flung outwardly in said tank by centrifugal force during operation of said vehicle tends to be concentrated in said outwardly bulged portion of said tank, said fuel lines being connected to said tank at said outwardly bulged portion of said tank.

10. A personal vehicle as claimed in claim 1 wherein said compartment further comprises an open framework secured to said platform and framing the operator when standing on the said platofrm and handle means for gripping by the operator.

11. An aircraft vehicle as claimed in claim 10 wherein said compartment includes a generally U-shaped frame member and strut means for supporting said frame member perpendicularly to said platform, and said drive means in mounted above said compartment at the apex of said U-shaped frame member, said handle means extending downwardly from said frame member.

12. An aircraft vehicle as claimed in claim 10 wherein said compartment includes a plurality of frame members spaced about the periphery of said platform for supporting said drive means at a level below the handle means and hence below shoulder level of an operator of average height, said handle means including a support member formed by an extension of one said frame members and a crossbar secured to the free end of said support member for gripping by the operator.

* * * * *